(12) United States Patent
Ikeda

(10) Patent No.: US 6,879,334 B2
(45) Date of Patent: Apr. 12, 2005

(54) IMAGE FORMING APPARATUS CAPABLE OF CONTROLLING WRITE START POSITION OF EACH BEAM

(75) Inventor: Yoshito Ikeda, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 10/279,558

(22) Filed: Oct. 25, 2002

(65) Prior Publication Data

US 2003/0090744 A1 May 15, 2003

(30) Foreign Application Priority Data

Oct. 26, 2001 (JP) ........................................ 2001-329485

(51) Int. Cl.$^7$ ............................................... B41J 2/435
(52) U.S. Cl. ..................................... 347/235; 347/250
(58) Field of Search ................................ 347/233–235, 347/248–250; 250/234

(56) References Cited

U.S. PATENT DOCUMENTS

| | | | | |
|---|---|---|---|---|
| 5,966,231 A | | 10/1999 | Bush et al. ................ | 359/204 |
| 6,005,243 A | * | 12/1999 | Yamazaki ................. | 250/234 |
| 6,108,023 A | | 8/2000 | Seino ........................ | 347/236 |
| 6,154,246 A | * | 11/2000 | Ogasawara et al. ....... | 347/250 |
| 6,198,495 B1 | * | 3/2001 | Sawada .................... | 347/233 |

FOREIGN PATENT DOCUMENTS

| | | |
|---|---|---|
| JP | 6-300980 | 10/1994 |
| JP | 9-66630 | 3/1997 |
| JP | 10-68900 | 3/1998 |
| JP | 11-194283 | 7/1999 |

OTHER PUBLICATIONS

U.S. Appl. No. 09/725,563, filed Nov. 30, 2000, pending.
U.S. Appl. No. 10/102,853, filed Mar. 22, 2002, pending.
U.S. Appl. No. 10/279,558, filed Oct. 25, 2002, Ikeda.
U.S. Appl. No. 10/849,164, filed May 20, 2004, Ikeda.

* cited by examiner

*Primary Examiner*—Hai Pham
(74) *Attorney, Agent, or Firm*—Oblon, Spivak, McClelland, Maier & Neustadt, P.C.

(57) ABSTRACT

An image forming apparatus shifts a scanning position on a surface scanned of each of a plurality of optical beams in a main scanning direction and a sub-scanning direction, and scans a plurality of lines simultaneously in the main scanning direction by a deflecting part. A synchronization detecting sensor detects the plurality of optical beams. A counting part counts a clock having a higher frequency than a dot clock in an interval between a synchronization detection point of a first beam and a synchronization detection point of a second beam, the first and second beams being included in the optical beams detected by the synchronization detecting sensor. A determining part determines a starting position of writing for each of the plurality of optical beams based on a counted value counted by the counting part. A writing part writes each dot from the starting position of each of the plurality of optical beams determined by the determining part, according to the clock having the higher frequency than the dot clock.

6 Claims, 7 Drawing Sheets

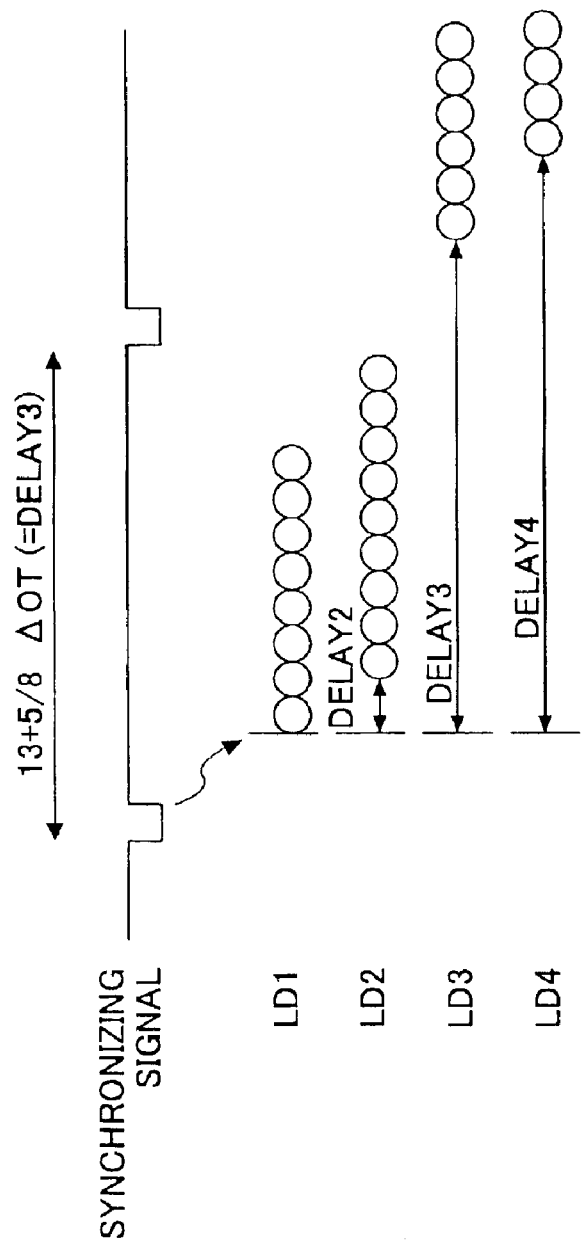

IMAGE FORMING APPARATUS CAPABLE OF CONTROLLING WRITE START POSITION OF EACH BEAM

BACKGROUND OF THE INVENTION

1. Field of the Invention

The present invention generally relates to image forming apparatuses that shift a scanning position on a surface scanned of each of a plurality of optical beams to a main scanning direction and a sub-scanning direction, and at the same time, simultaneously scan a plurality of lines in the main scanning direction by a deflector.

2. Description of the Related Art

Conventional methods of correcting a starting position for writing (hereinafter referred to as a "writing start position"), of each beam in this kind of a multi-beam image forming apparatus are proposed in Japanese Laid-Open Patent Applications No. 6-300980, No. 9-66630, No. 10-68900 and No. 11-194238, for example.

In order to realize a faster digital laser printer, a faster multi-beam polygon motor is required. In a system where multi-beams are used and the writing start position of each beam is determined according to a synchronizing signal obtained from each light emission, concurrently with the speeding up of the polygon motor, the interval between incident beams is becoming shorter.

SUMMARY OF THE INVENTION

It is a general object of the present invention to provide an image forming apparatus capable of correctly controlling a writing start position of each beam, even when the interval of beams incident onto a synchronization-detecting sensor is short since a higher speed polygon mirror is used.

In order to achieve the above-mentioned object, according to one aspect of the present invention, there is provided an image forming apparatus that shifts a scanning position on a surface scanned of each of a plurality of optical beams in a main scanning direction and a sub-scanning direction and scans a plurality of lines simultaneously in the main scanning direction by a deflecting part, including: a synchronization detecting sensor detecting the plurality of optical beams; a counter counting a clock having a higher frequency than a dot clock in an interval between a synchronization detection point of a first beam and a synchronization detection point of a second beam, the first and second beams included in the plurality of optical beams detected by the synchronization detecting sensor; a determining part determining a starting position of writing for each of the optical beams based on a counted value counted by the counting part; and a writing part writing each dot from the starting position of each of the plurality of optical beams determined by the determining part, according to the clock having the higher frequency than the dot clock.

In addition, according to another aspect of the present invention, the clock having a higher frequency than the dot clock may have a frequency obtained by using a multiple of the frequency of the dot clock.

According to the present invention, it is possible to correctly control the writing start position of each beam, even when the interval of the beams incident onto the synchronization detection sensor is short since the faster polygon mirror is used.

Other objects, features and advantages of the present invention will become more apparent from the following detailed description when read in conjunction with the following drawings.

BRIEF DESCRIPTION OF THE DRAWINGS

FIG. 7 is an explanatory diagram showing the starting position for writing of each beam when four beams are used.

DETAILED DESCRIPTION OF THE PREFERRED EMBODIMENTS

Figure 1:
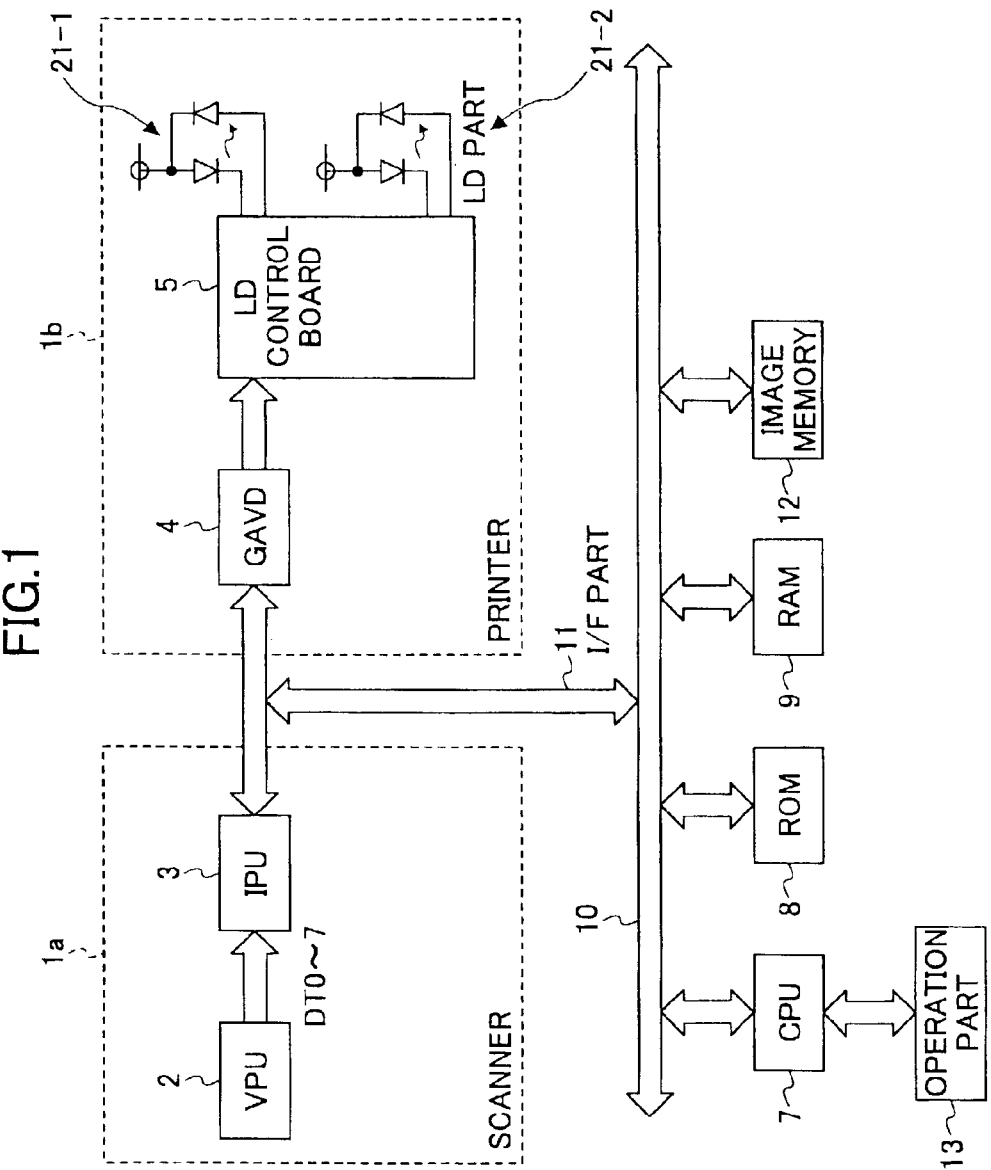
FIG. 1 is a schematic block diagram showing a digital copying machine as one embodiment of an image forming apparatus according to the present invention.

In the following, a description will be given of embodiments of the present invention, by referring to the drawings. FIG. 1 is a schematic block diagram showing a digital copying machine, as one embodiment of an image forming apparatus according to the present invention. The digital copying machine includes a scanner 1a reading an original image and a printer 1b. The scanner 1a includes a VPU 2 and an IPU 3. The VPU 2 performs A/D conversion on a read signal and performs black offset correction, shading correction and dot position correction. The IPU 3 performs image processing. The printer 1b includes two semiconductor lasers (laser diodes)("LD parts") 21-1 and 21-2 that perform imaging of an electrostatic latent image on a drum, a GAVD (write control application-specific integrated circuit, write control ASIC) 4 that controls the printer 1b, and an LD control part 5 that controls the LD parts 21-1 and 21-2.

The digital copying machine also includes a CPU 7 that performs the control of the whole apparatus, a ROM 8 storing a control program, a RAM 9 temporarily used by the control program, an image memory 12 storing a read image, an internal system bus 10 that handles transmission/reception of data among the units, an I/F part 11 that interfaces the internal system bus 10 and the IPU 3, and an operation part 13 by which a user gives an instruction and the like.

Figure 2:
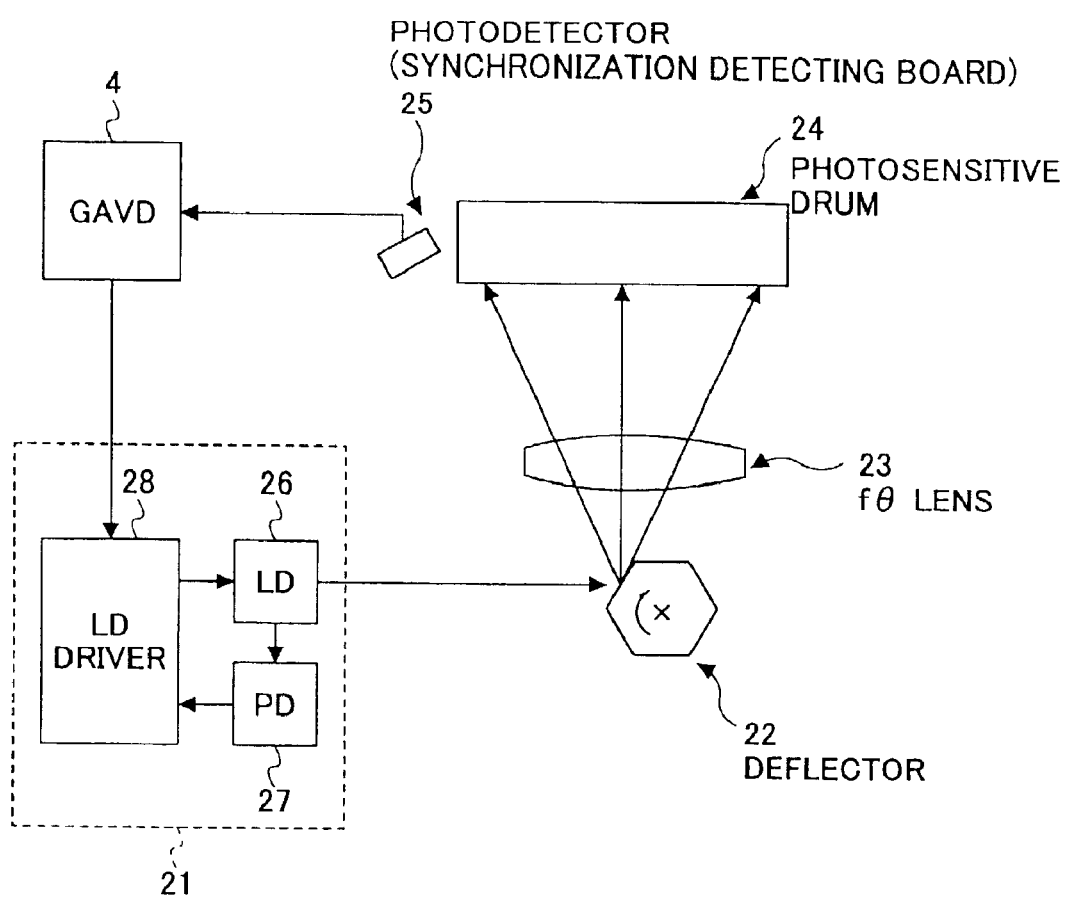
FIG. 2 is a schematic block diagram of the writing unit of the digital copying machine of FIG. 1.

FIG. 2 is a schematic diagram of a writing unit of the digital copying machine of FIG. 1. Each of the LD parts 21-1 and 21-2 has the same structure and includes an LD (laser diode) 26, a photodetector (PD) 27 and an LD driver (semiconductor laser drive circuit) 28. The LDs 26 of the LD parts 21-1 and 21-2 are arranged separately in a main scanning direction and a sub-scanning direction. A laser beam projected ahead from each of the LDs 26 is collimated by a collimator lens (not shown), deflected by a deflector 22 formed by a polygon mirror, and focused, by a fθ lens 23, on a surface of a photosensitive drum 24 which surface is uniformly electrified by a charger. The imaging spot is repeatedly moved in the axial direction (main scanning direction) of the photosensitive drum 24 by the rotation of the deflector 22, and at the same time, the photosensitive drum 24 rotates (sub-scanning direction).

A photodetector 25 is provided at the outside of an information writing area of the photosensitive drum 24 and generates a synchronizing signal (XDETP) by detecting a laser beam that is deflected by the polygon mirror (deflector) 22. The GAVD 4 separates the synchronizing signal obtained from the photodetector 25 for each of the LDs 26. A plurality of separated signals (synchronization detection signals) DET1 and DET2 are rendered to be reference signals for calculating the writing start position of each of the LDs 26. The GAVD 4 applies an image information signal to the LD driver 28. The GAVD 4 controls the timing of applying the image information signal according to the synchronization detection signals DET1 and DET2 created based on the synchronizing signals supplied from the photodetector 25.

According to the image information signal from the GAVD 4, the LD driver 28 drives each of the LDs 26 so as to form an electrostatic latent image on the photosensitive drum 24. The electrostatic latent image is developed by a developing unit and transferred onto such as a transfer paper by a transferring unit. In addition, a laser beam emitted from the LD 26 is directed backward so as to be incident on the PD 27 and the optical power is detected. The LD driver 28 controls the LD 26 according to an output signal of the PD 27 so as to control the output light amount of the LD 26 constant (Automatic Power Control).

Figure 3:
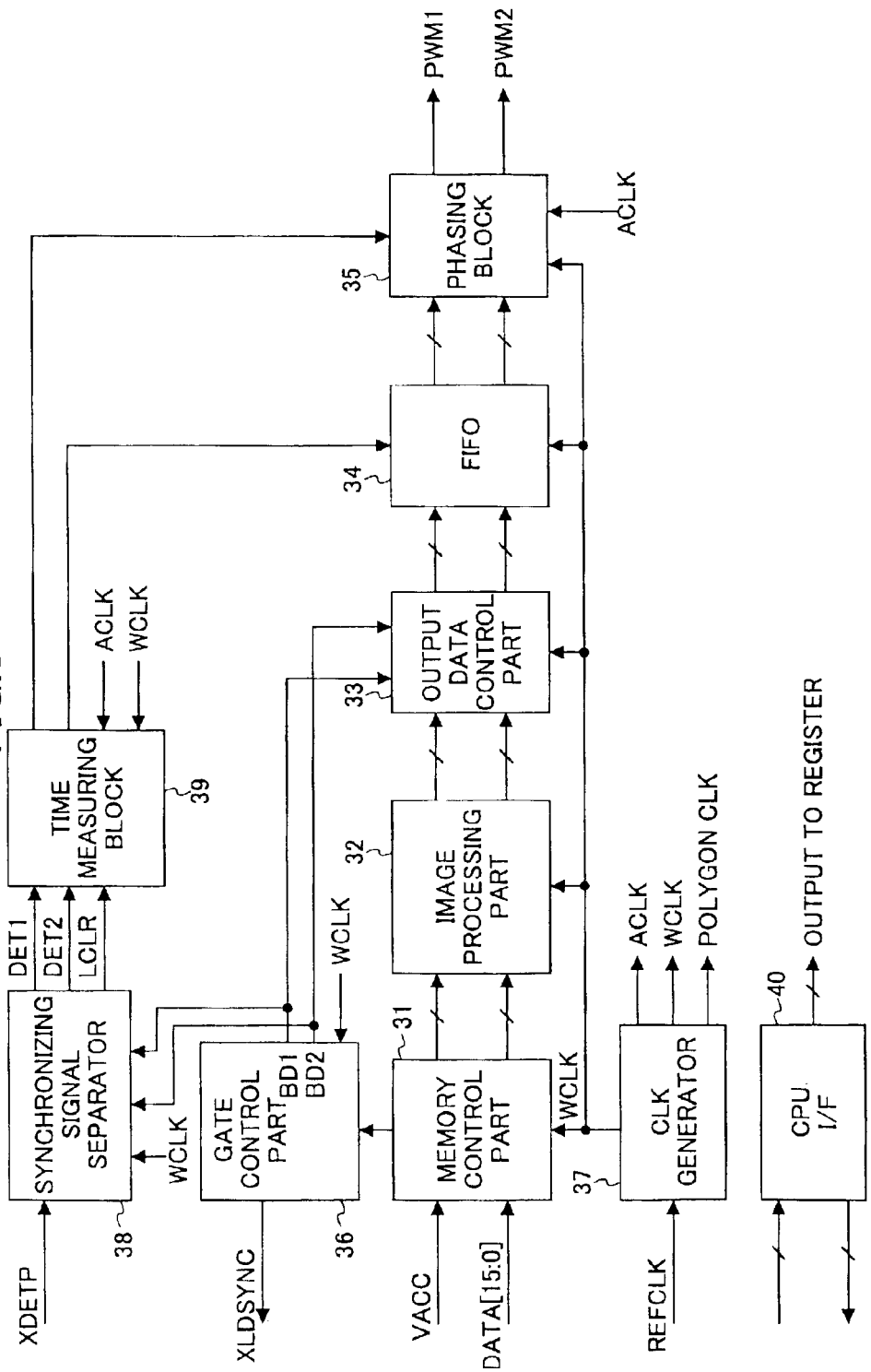
FIG. 3 is a block diagram showing the GAVD of FIG. 1 in detail.

FIG. 3 is a schematic block diagram of the GAVD 4 performing the control according to the present invention. Image data from the IPU 3 are output after processing by the GAVD 4 as image information signals PWM1 and PWM2 for two lines via a memory control block 31 that receives a valid image area signal (VACC) from the IPU 3 and performs speed conversion and format conversion, an image processing part 32 that performs image processing on the image data from the memory control block 31, an output data control part 33 that performs processes such as γ conversion and P sensor pattern giving on the image data from the image processing part 32, a FIFO 34 that performs a delay operation of image formation in dot units (hereinafter referred to as a "dot image delay operation") according to the measured result of a time measuring block 39, and a phasing block 35 that performs a delay operation of the image formation in units less than a dot (hereinafter referred to as a "less-than-dot image delay operation"), that is, dots are written with a delay and at intervals less than one period of a writing clock WCLK, which will be described later.

The GAVD 4 also includes a gate control part 36, a CLK generator 37, a synchronizing signal separator 38, the time measuring block 39 and a CPU I/F 40. The gate control part 36 generates a gate signal that determines an operation starting position of the sub-scanning direction and the main scanning direction. In addition, the gate control part 36 outputs a signal (XLDSYNC) in synchronization with the synchronizing signal (XDETP). The CLK generator 37 receives a reference clock (REFCLK) and generates the writing clock WCLK and a polygon clock CLK. The synchronizing signal separator 38 separates the synchronizing signal (XDETP) supplied from the photodetector 25 on a synchronization detecting board. The time measuring block 39 measures the number (time) of the writing clocks WCLKs between the separated synchronization detection signals DET1 and DET2. The CPU I/F 40 supplies, to each block, setting data transferred by the CPU 7 of the main body (digital copying machine of FIG. 1).

The CLK generator 37 generates an image CLK (WCLK, dot clock) by generating a multiplied frequency (ACLK) of the image CLK using a PLL and dividing the ACLK beforehand by a given number. In this embodiment, a description will be given by assuming that the frequency of the WCLK is obtained by dividing the ACLK by eight.

The output data control part 33 includes a P pattern block, a γ-conversion block, an APC block, a dot counting block and an LD on/off block. The P pattern block gives, to data that are input by the image processing part 32, a P sensor pattern for placing toner of a predetermined density on the photosensitive drum 24 so as to obtain data that determine process conditions. The γ conversion block varies the weight of the data. The APC block provides an image in synchronization with the APC operation timing for maintaining the light amount of the LD 26 constant. The dot counting block counts the number of dots by each LD. The LD on/off block provides data for synchronization detection.

Hereinafter, a detailed description will be given of the parts specifically relating to the present invention. The synchronizing signal separator 38 performs the separation into the synchronization detection signals DET1 and DET2 based on "and" condition of light forcing signals (internal signals) BD 1 and BD 2 for the LDs which signals are generated by the gate control part 36. The synchronization detection signals DET1 and DET2 that are separated by the synchronizing signal separator 38 are input to the time measuring block 39 with a main scanning clear signal (LCLR) that is used by all blocks (parts) of the GAVD 4. The counter is operated by the ACLK taking the synchronization detection signals DET1 and DET2 as a counter reset signal and a counter stop signal, respectively, and the distance between DET1 and DET2 is measured as a counter value. The time measuring block 39 divides the measured value (counter value) into an image CLK part (integer part) and a part less than the image CLK (decimal part), and supplies information (delay information) of the integer part and information (delay information) of the decimal part to the FIFO 34 and the phasing block 35, respectively. Based on the above-described information, the FIFO 34 performs the dot image delay operation, while the phasing block 35 performs the less-than-dot image delay operation.

Figure 4:
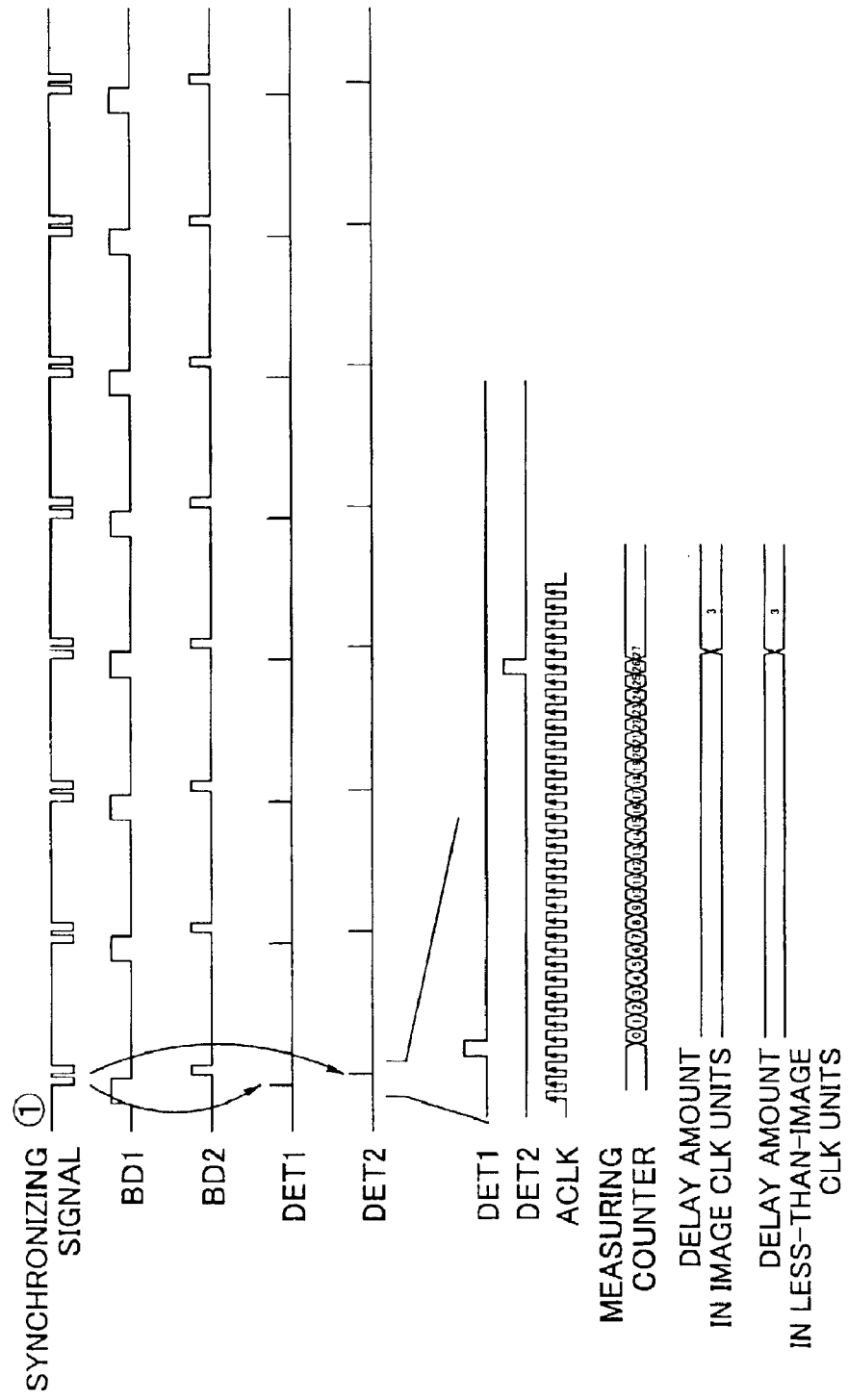
FIG. 4 is a timing chart showing a synchronization detection signal when two beams are used.

FIG. 4 is a timing chart for explaining the operation of the GAVD 4. The signal detected by the photodetector 25 is separated into the synchronization detection signals DET1 and DET2 according to the light forcing signals BD 1 and BD 2, and the distance between the DET1 and DET2 is counted by the time measuring block 39. In other words, the measuring counter of the time measuring block 39 is reset by the DET1, counted up by the writing CLK (WCLK), and the counting up is stopped by the DET2 so as to measure the distance in the main scanning direction between the two LDs 26 as the counter value (in the embodiment, the distance is 27 CLK (ACLK)). Thereafter, the writing start position of each of the LDs 26 in the main scanning direction is determined by dividing the measured result "27 CLK (ACLK)" into "3 dots" and "3/8 dot" (27/8=3+3/8 where the ACLK has a frequency eight times the frequency of the image CLK).

Figure 5:
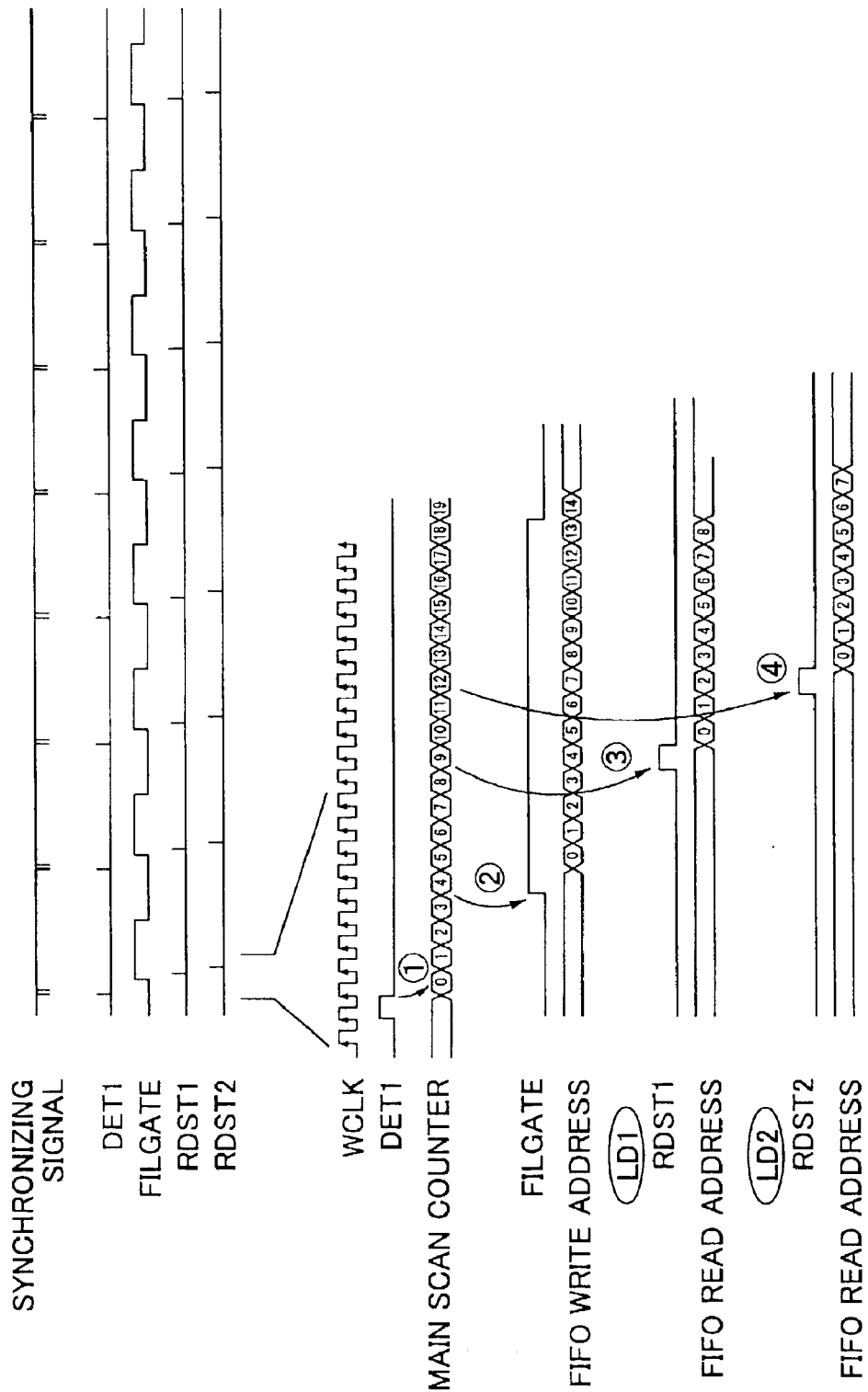
FIG. 5 is a timing chart for explaining a starting position for writing of each beam when two beams are used.

FIG. 5 is a detailed example of the delaying in dot units using the FIFO 34, based on the measured result. The time measuring block 39 monitors and compares a main scan counter that is reset by the synchronization detection signal DET1 and counted up by the writing CLK (WCLK), and generates read start signals (RDST 1, RDST 2) corresponding to the measured result in dot units obtained in FIG. 4 for the FIFO 34.

① The main scan counter is reset by the synchronization detection signal DET1, and thereafter, the counting is started.

② When the value of the main scan counter reaches an arbitrary value, the time measuring block 39, for example, generates a FILGATE signal to start writing to the FIFO 34. The write address of the FIFO 34 is reset by the rise of the FILGATE signal.

③ When the main scan counter reaches a set value (a FIFO reading set value, "8", in this case), the time measuring block 39 generates the RDST 1 signal that determines the timing of reading from the FIFO 34 for the preceding (first) LD 26-1. By the RDST 1 signal, the read address of the FIFO 34 is reset once. Thereafter, the image data are read from the FIFO 34 according to the counter value.

④ Subsequently, when the main scan counter matches "the FIFO reading set value+the measured result" (in this case, 8+3=11), the time measuring block 39 generates the RDST 2 signal that determines the timing of reading from the FIFO 34 for the subsequent (second) LD 26-2. BY the RDST 2 signal, the read address of the FIFO 34 for the subsequent LD 26-2 is reset once. Thereafter, the image data are read from the FIFO 34 according to the counter value. As mentioned above, by reflecting the distance between the LDs 26 to the timing of reading from the FIFO 34, positioning in the main scanning direction in dot units is realized.

Figure 6:
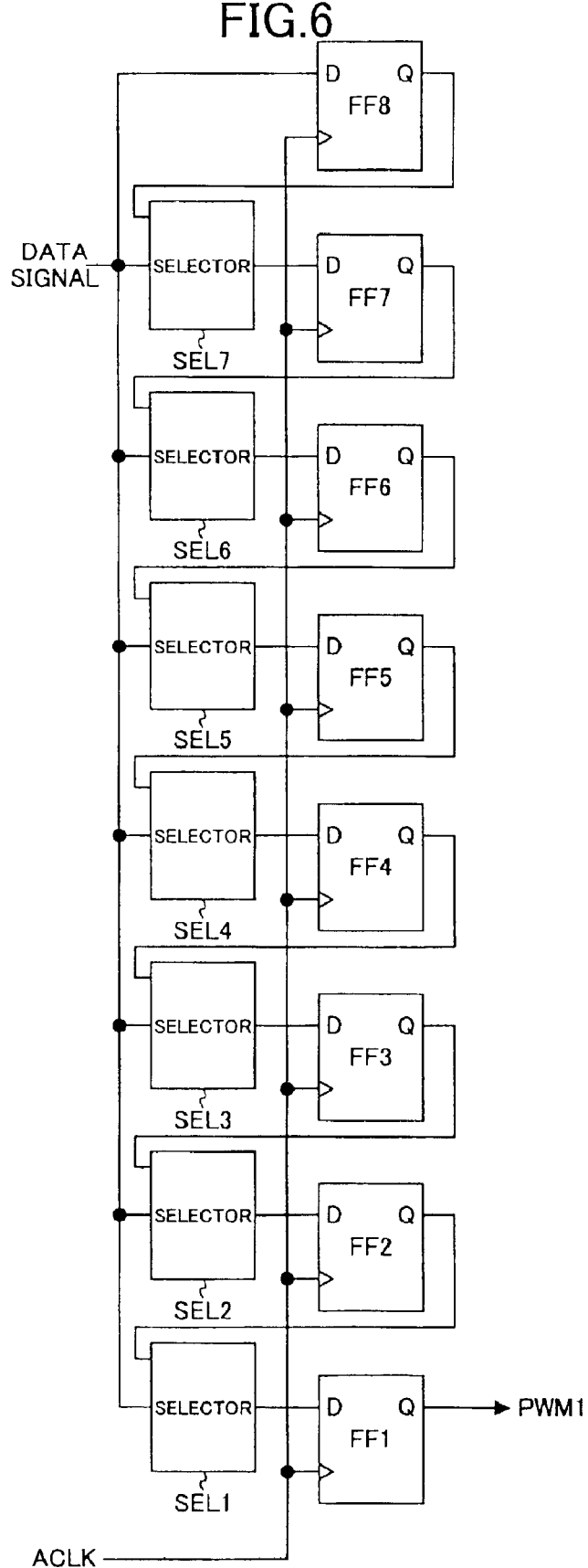
FIG. 6 is a block diagram showing the phasing block of FIG. 3 in detail.

FIG. 6 is a detailed example of the phasing block 35 that performs delay adjustment in a unit less than a dot (less-than-dot units). The delay adjustment is realized by arranging eight FFs FF1 through FF8 (and selectors (selector circuits) SEL1 through SEL7) and successively shifting according to the ACLK. Based on the delay information supplied to the phasing block 35 (in this case, a ⅜ dot delay), the designated selector circuit (in this embodiment, the selector SEL3) is operated. Accordingly, the image information from the previous process is supplied to the FF3 by the selector SEL3, and by successively supplying the image information to the FF2 and FF1, it is possible to realize the ⅜ dot delay.

In the above-described embodiment, the distance between the LD 26-1 and the LD 26-2 is calculated from the separation of the synchronizing signal and the measured (calculated) result is reflected to the timing of reading from the FIFO 34 and to the selectors of the phasing block 35. However, when the value of the difference is mechanically calculated as a fixed value beforehand, it is possible to reflect the fixed value preferentially by employing a special mode called the SP mode.

FIG. 7 is a schematic diagram for explaining an embodiment where the delay is realized by obtaining the delay amount of each LD, the number of LDs being more than the number of the synchronization detection signals, from the measured value obtained from the synchronization detection signals and set values set by the SP mode beforehand. In four existing LDs LD 1 through LD 4, the LD 1 that operates first and the LD 3 that operates third are synchronized. The distance between the first operated LD 1 and the second operated LD 2 and the distance between the third operated LD 3 and the fourth operated LD 4 are mechanically determined, and the information of the distances is set by the special mode called the SP mode beforehand. In this embodiment, the information is set as follows, for example.

LD 1~LD 2: DELAY12: (1+⅝) is set

LD 3~LD 4: DELAY34: (2+⅜) is set

In this embodiment, the delay amount with respect to the first LD is obtained for each LD from the information DELAY3 that is obtained from the synchronization detection signal and the information of DELAY12 and DELAY34, and the delay amount is reflected to the image data.

The present invention is not limited to the specifically disclosed embodiments, and variations and modifications may be made without departing from the scope of the present invention.

The present application is based on Japanese priority application No. 2001-329485 filed on Oct. 26, 2001, the entire contents of which are hereby incorporated by reference.

What is claimed is:

1. An image forming apparatus configured to shift a scanning position on a surface scanned of each of a plurality of optical beams in a main scanning direction and a sub-scanning direction, and to scan a plurality of lines simultaneously in the main scanning direction by a deflecting part, comprising:

a synchronization detecting sensor configured to detect the plurality of optical beams;

a counter configured to count a clock having a higher frequency than a dot clock in an interval between a synchronization detection point of a first beam and a synchronization detection point of a second beam, said first and second beams included in the plurality of optical beams detected by said synchronization detecting sensor, and to divide a counted value into first information that indicates a number of the dot clocks and second information that indicates a number of the clocks;

a determining part configured to determine a starting position of writing for each of the plurality of optical beams based on the counted value counted by said counter and including a first delaying part and a second delaying part, the first delaying part configured to delay the starting position of writing of each of the plurality of optical beams in units of the dot clocks based on the first information, and the second delaying part configured to delay the starting position of writing in units of the clocks having the higher frequency than the dot clock based on the second information; and a writing part configured to write each dot from the starting position of writing of each of the plurality of optical beams determined by said determining part, according to the clock having the higher frequency than the dot clock.

2. The image forming apparatus as claimed in claim 1, wherein the frequency of the clock having the higher frequency than the dot clock is obtained by multiplying a frequency of the dot clock by a predetermined number.

3. The image forming apparatus as claimed in claim 1, wherein the writing part writes dots at intervals less than one period of the dot clock.

4. An image forming apparatus configured to shift a scanning position on a surface scanned of each of a plurality of optical beams in a main scanning direction and a sub-scanning direction, and to scan a plurality of lines simultaneously in the main scanning direction by means for deflecting, comprising:

means for detecting the plurality of optical beams;

means for counting a clock having a higher frequency than a dot clock in an interval between a synchroniza tion detection point of a first beam and a synchroniza tion detection point of a second beam, said first and second beams included in the plurality of optical beams detected by said means for detecting, and for dividing a counted value into first information that indicates a number of the dot clocks and second information that indicates a number of the clocks;

means for determining a starting position of writing for each of the plurality of optical beams based on the counted value counted by said means for counting and including first means for delaying and second means for delaying, the first means delaying the starting position of writing of each of the plurality of optical beams in units of the dot clocks based on the first information, and the second means delaying the starting position of writing in units of the clocks having the higher frequency than the dot clock based on the second information; and means for writing each dot from the starting position of writing of each of the plurality of optical beams determined by said means for determining, according to the clock having the higher frequency than the dot clock.

5. The image forming apparatus as claimed in claim 4, wherein the frequency of the clock having the higher frequency than the dot clock is obtained by multiplying a frequency of the dot clock by a predetermined number.

6. The image forming apparatus as claimed in claim 4, wherein the means for writing writes dots at intervals less than one period of the dot clock.

* * * * *